(12) United States Patent
Jo et al.

(10) Patent No.: US 12,379,203 B2
(45) Date of Patent: Aug. 5, 2025

(54) THICKNESS MEASUREMENT DEVICE

(71) Applicant: LG ELECTRONICS INC., Seoul (KR)

(72) Inventors: Seohyeon Jo, Seoul (KR); Daecheol Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/034,831

(22) PCT Filed: May 18, 2022

(86) PCT No.: PCT/KR2022/095102
§ 371 (c)(1),
(2) Date: May 1, 2023

(87) PCT Pub. No.: WO2022/245195
PCT Pub. Date: Nov. 24, 2022

(65) Prior Publication Data
US 2023/0400294 A1 Dec. 14, 2023

(30) Foreign Application Priority Data
May 18, 2021 (KR) .................. 10-2021-0064414

(51) Int. Cl.
*G01B 11/25* (2006.01)
*G01B 11/06* (2006.01)
(52) U.S. Cl.
CPC ...... *G01B 11/0608* (2013.01); *G01B 11/2504* (2013.01); *G01B 11/254* (2013.01)

(58) Field of Classification Search
CPC ............ G01B 11/0608; G01B 11/2504; G01B 11/254; G01B 5/0002; G01B 2210/44;
(Continued)

(56) References Cited

U.S. PATENT DOCUMENTS 3,671,726 A * 6/1972 Kerr ........................ G01B 11/06
250/559.22
4,710,808 A * 12/1987 Hoogenboom ...... G01B 11/024
348/136

(Continued)

FOREIGN PATENT DOCUMENTS

KR      10-1912647 B1    10/2018
KR   10-2019-0082198 A    7/2019
(Continued)

*Primary Examiner* — Isiaka O Akanbi
(74) *Attorney, Agent, or Firm* — Birch, Stewart, Kolasch & Birch, LLP

(57) ABSTRACT

A thickness measurement device can include a stage module, an upper optical module above the stage module and spaced from the stage module in a Z-axis direction, a lower optical module below the stage module and spaced from the stage module in the Z-axis direction. The stage module has a larger area than the upper optical module and the lower optical module, a Y-axis movement mechanism for moving the stage along a Y-axis direction, a measurement specimen placement part which is disposed on the stage and on which a measurement specimen is placed, a specimen mounting part on which one of a reference specimen or a correction specimen is selectively mounted, and a specimen mounting part movement mechanism that is disposed on the stage and moves the specimen mounting part along the Z-axis direction.

16 Claims, 13 Drawing Sheets

(58) Field of Classification Search
CPC ........... G01B 11/06; G01B 11/25; G06T 7/00; G06T 17/00
USPC ........................... 356/605–624, 237.1–237.6
See application file for complete search history.

(56) References Cited

U.S. PATENT DOCUMENTS

| | | | |
|---|---|---|---|
| 5,485,082 A | 1/1996 | Wisspeintner et al. | |
| 7,286,246 B2 * | 10/2007 | Yoshida | G01B 11/2527 250/559.22 |
| 8,554,503 B2 | 10/2013 | Schallmoser et al. | |
| 2003/0007161 A1 * | 1/2003 | Bowles | G01B 11/06 356/630 |
| 2003/0011789 A1 * | 1/2003 | Shirley | G01B 11/306 356/630 |
| 2008/0075328 A1 * | 3/2008 | Sciammarella | G01B 11/25 348/222.1 |
| 2018/0135968 A1 * | 5/2018 | Glickman | G01B 11/0691 |
| 2018/0374239 A1 | 12/2018 | Wallack et al. | |
| 2021/0310795 A1 * | 10/2021 | Walecki | G01B 11/2441 |

FOREIGN PATENT DOCUMENTS

| | | | | |
|---|---|---|---|---|
| KR | 10-2019-0132289 A | | 11/2019 | |
| KR | 20190132289 A | * | 11/2019 | ........... G01B 11/026 |

* cited by examiner

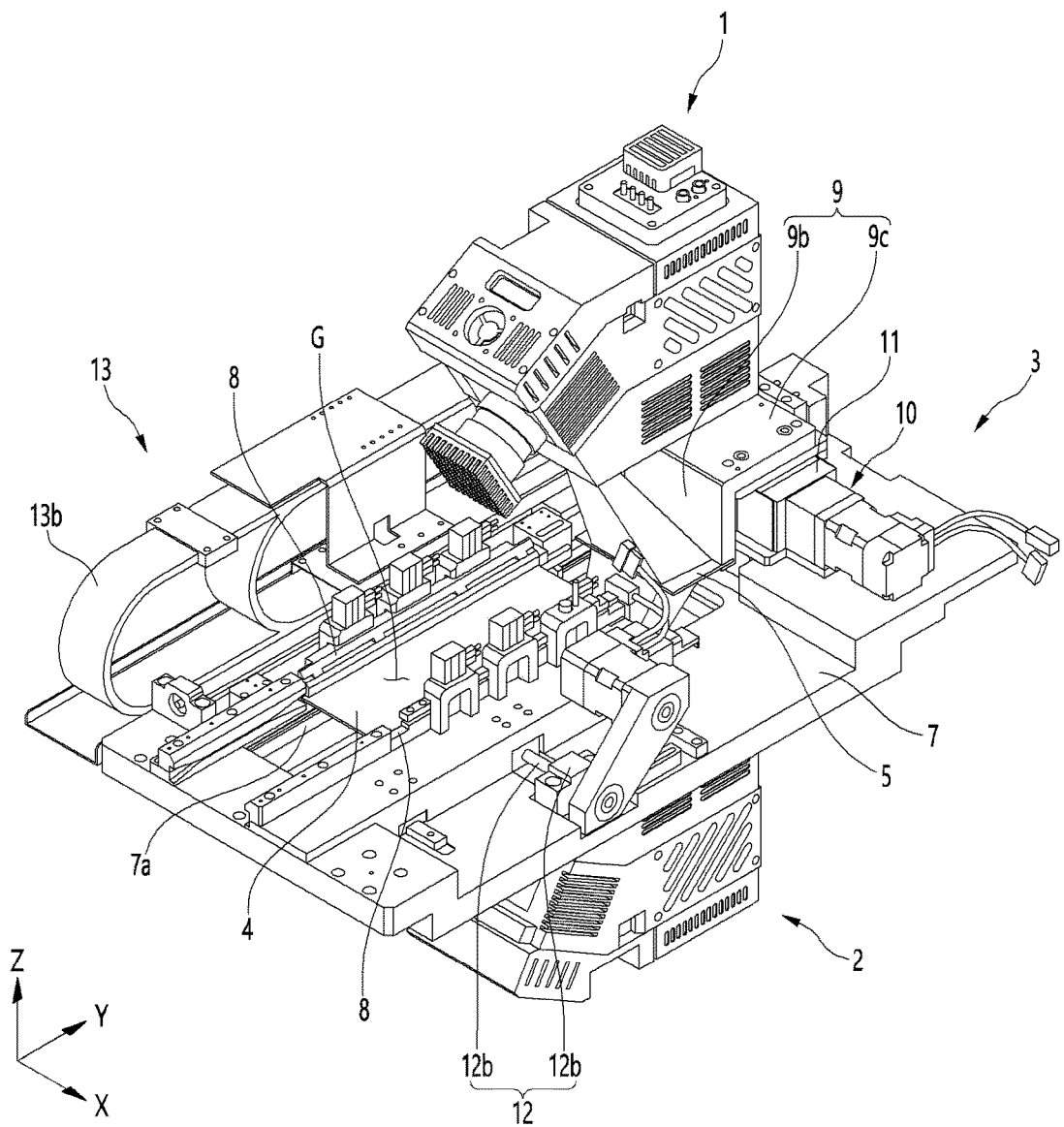
[FIG. 1]

[FIG. 2]
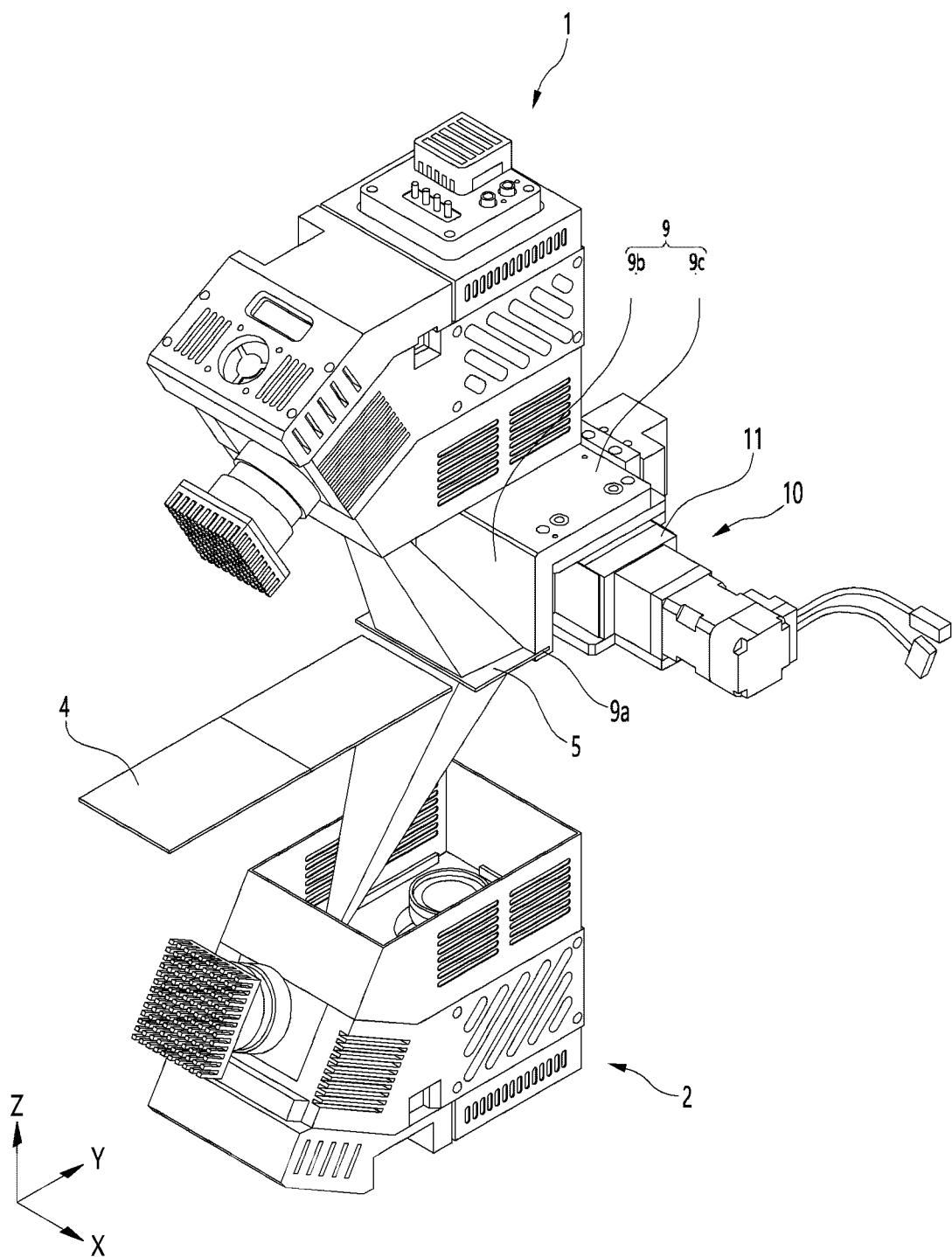

[FIG. 3]
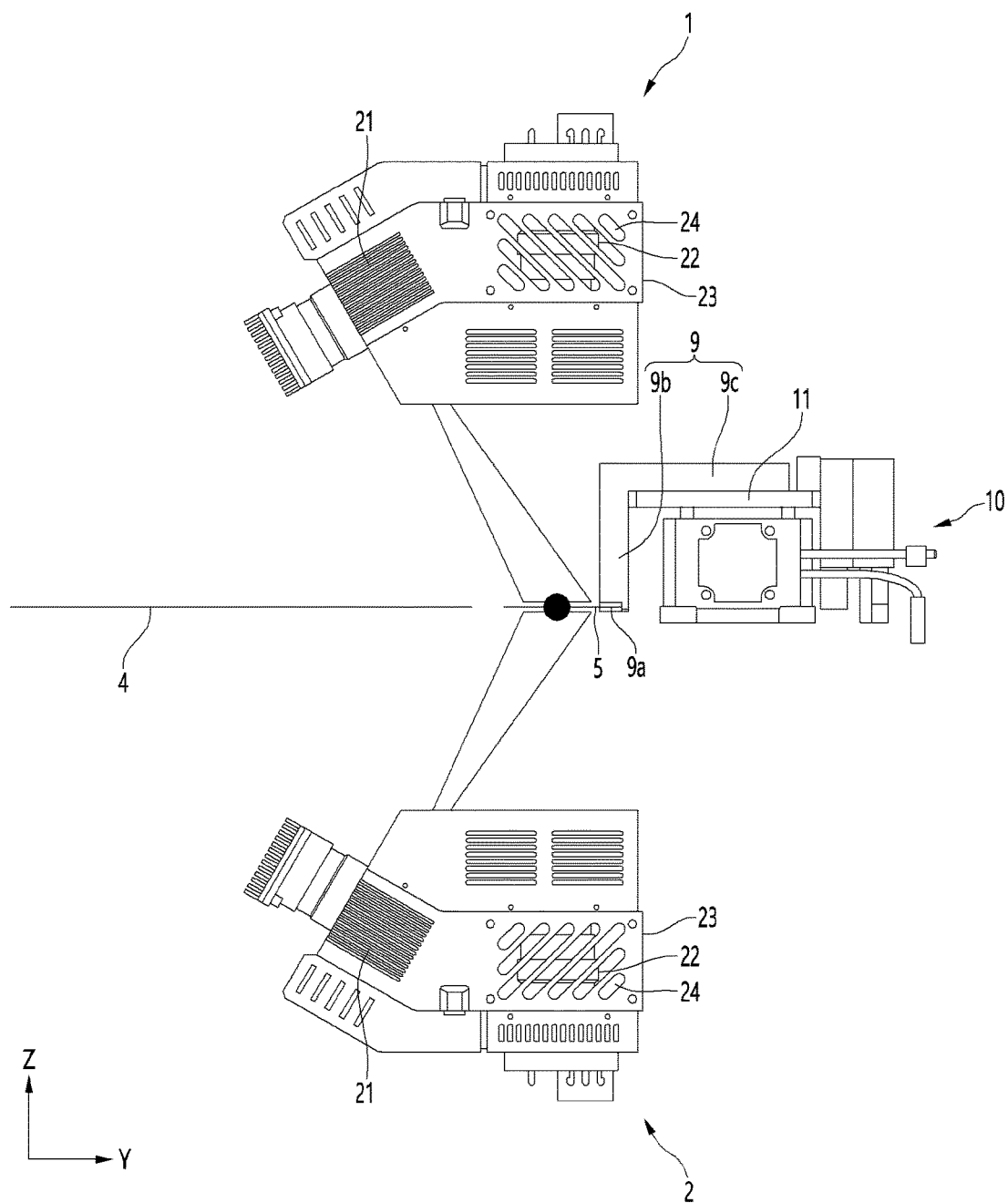

[FIG. 4]
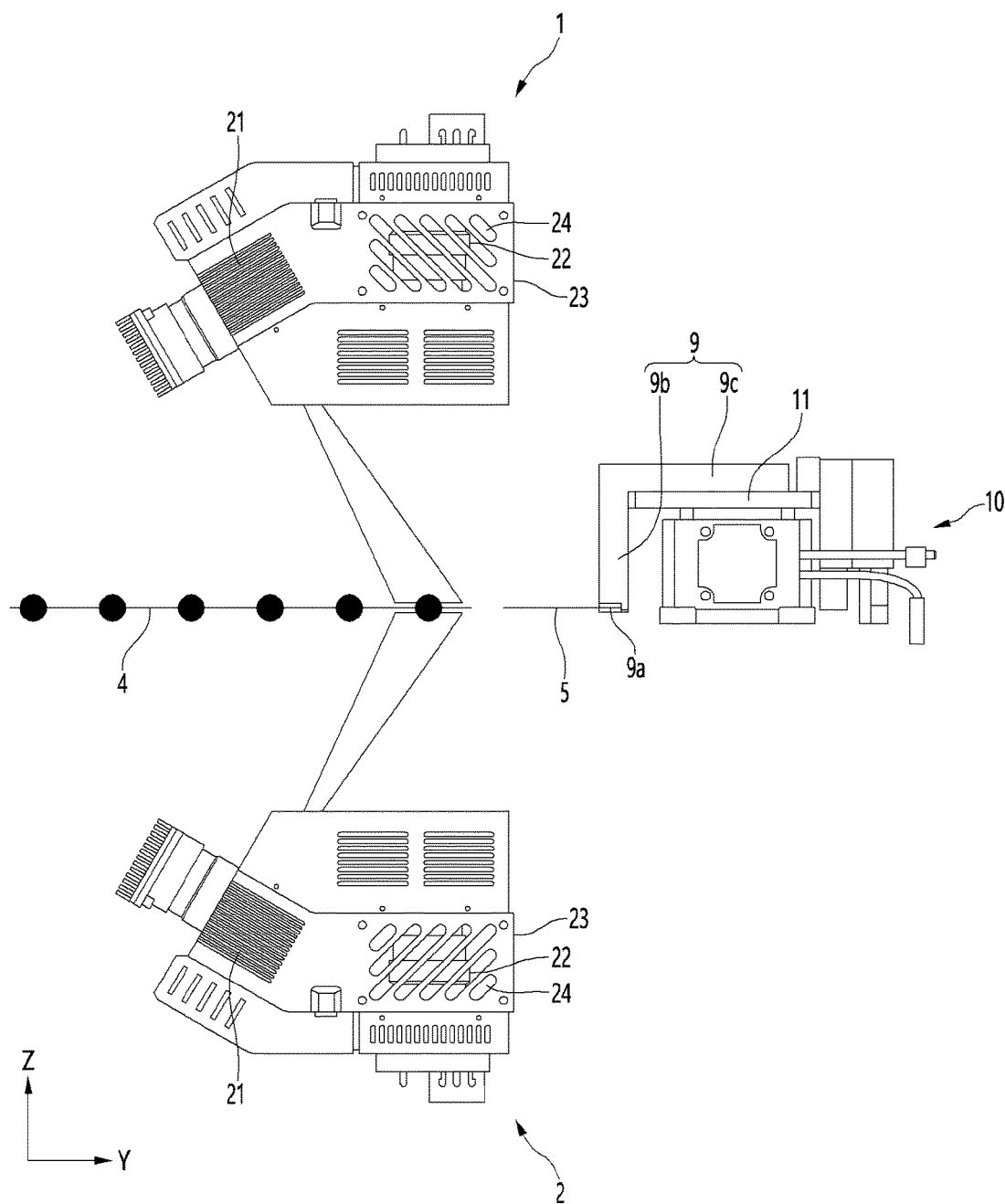

[FIG. 5]
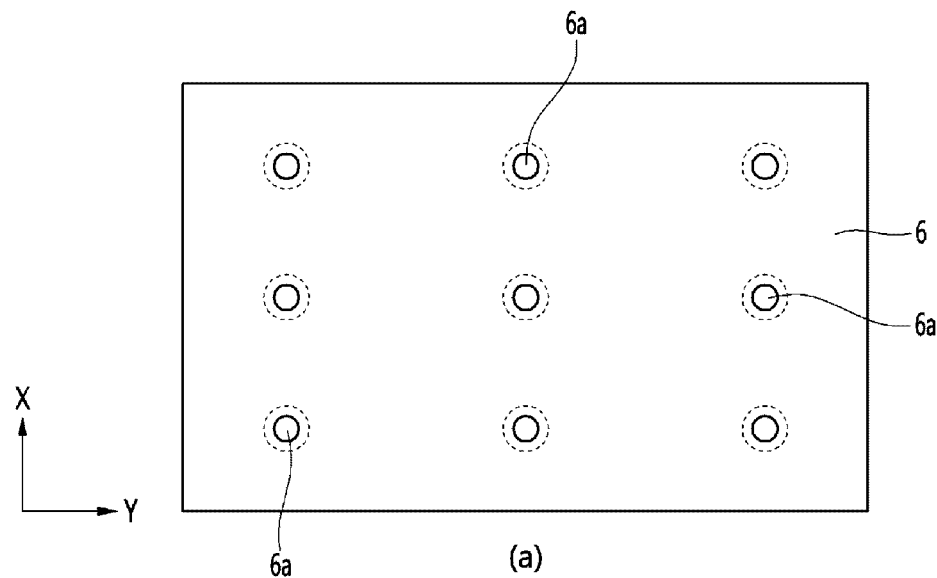
(a)
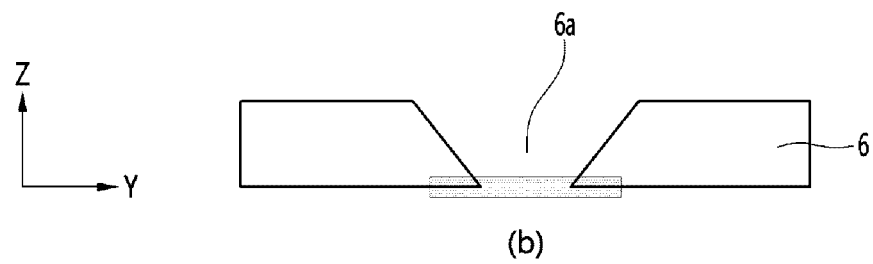
(b)
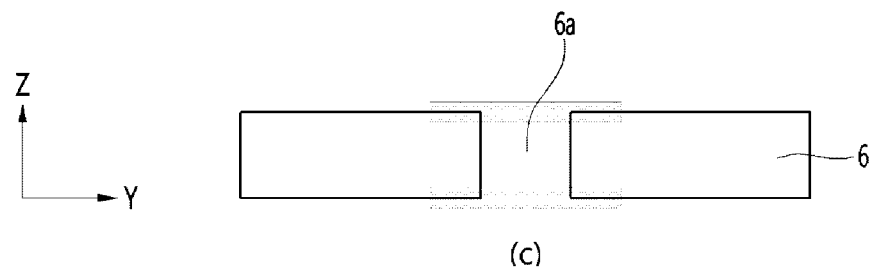
(c)

【FIG. 6】
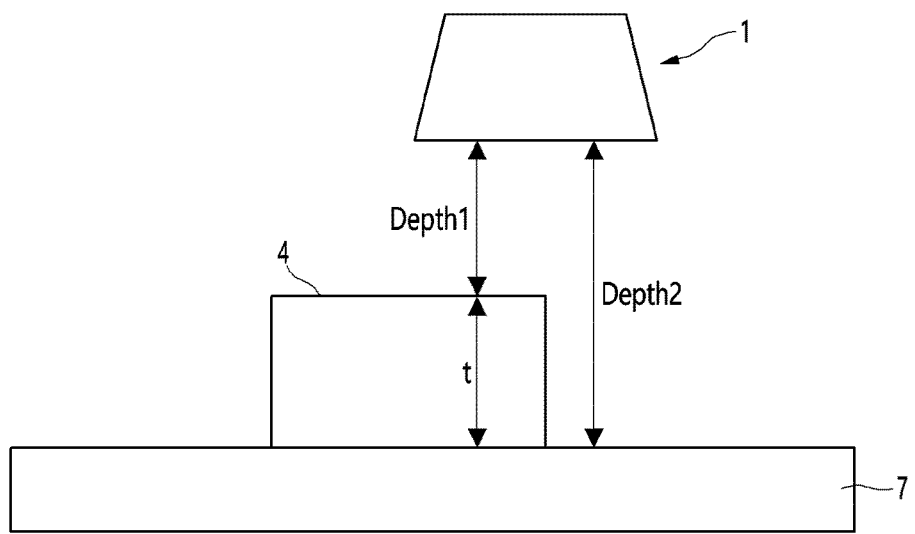
【FIG. 7】
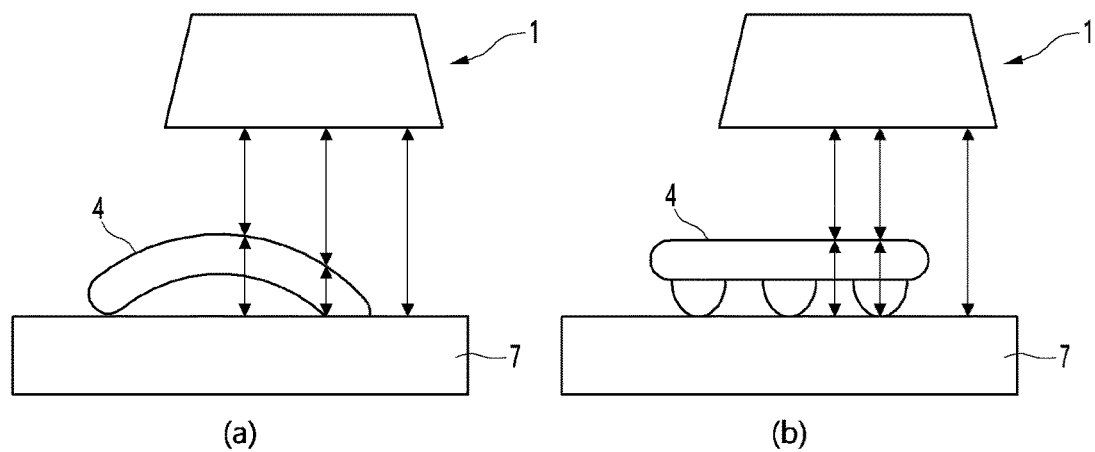
(a)　　　　　　　　　(b)

[FIG. 8]
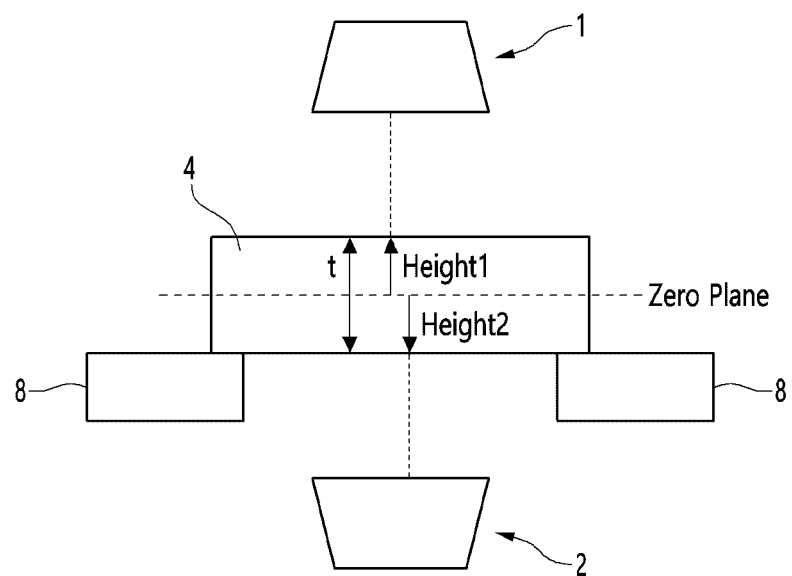
[FIG. 9]
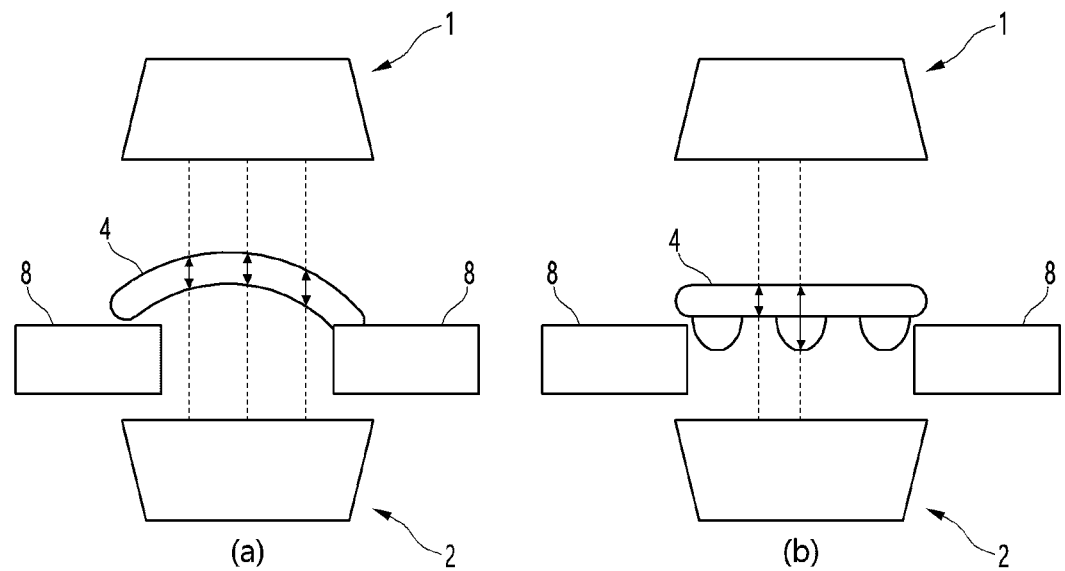

[FIG. 10]
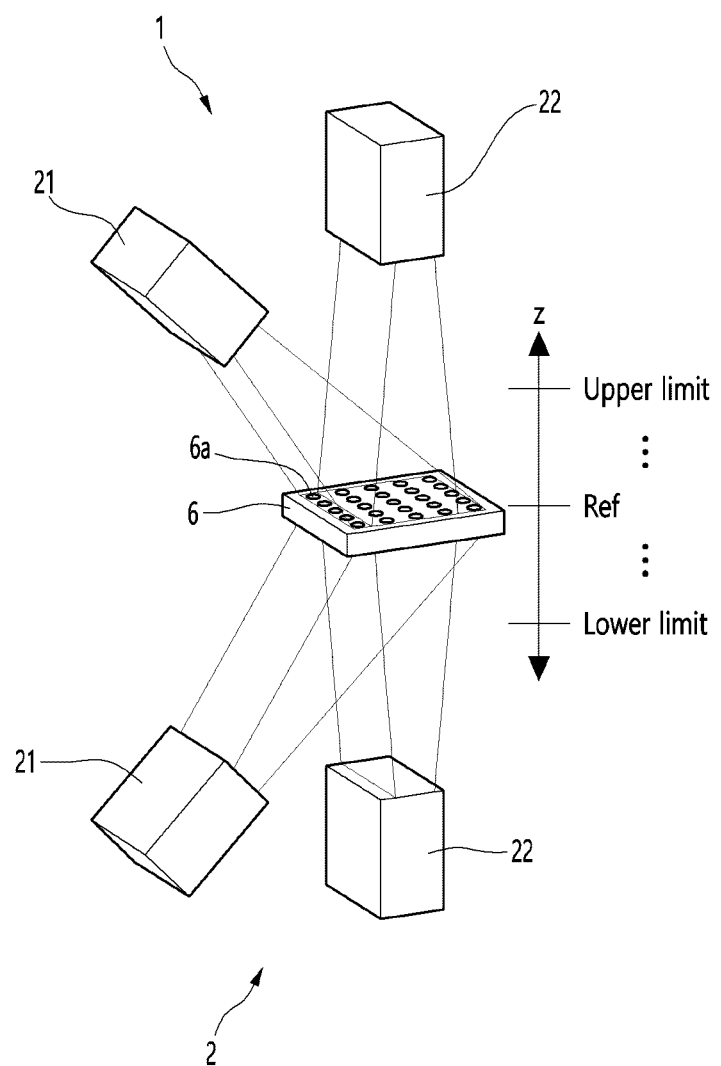

[FIG. 11]
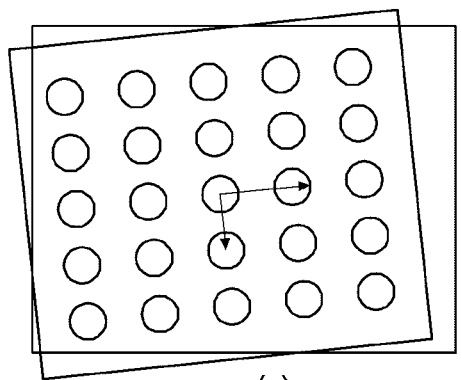
(a)
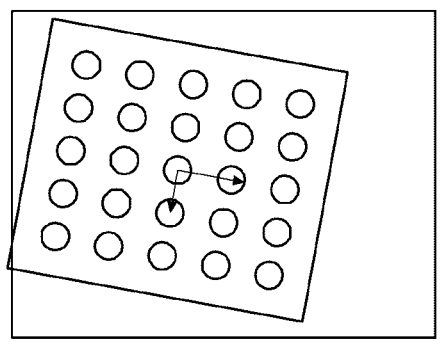
(d)
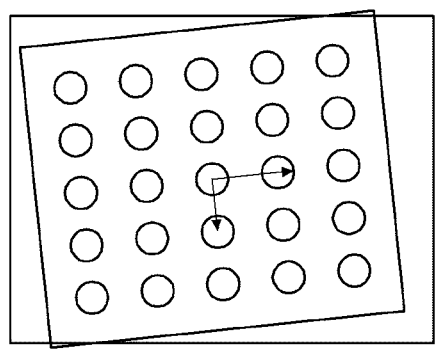
(b)
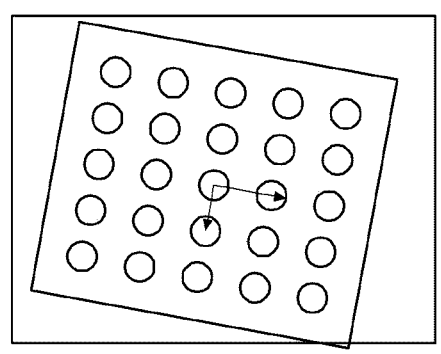
(e)
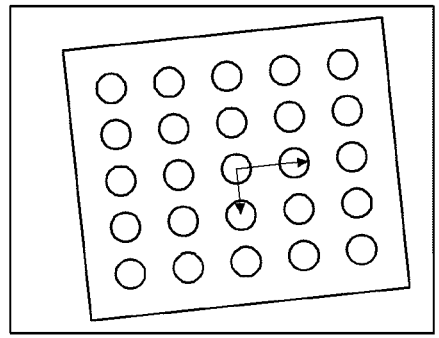
(c)
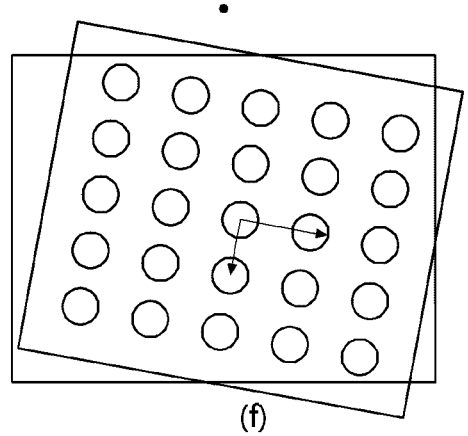
(f)

【FIG. 12】
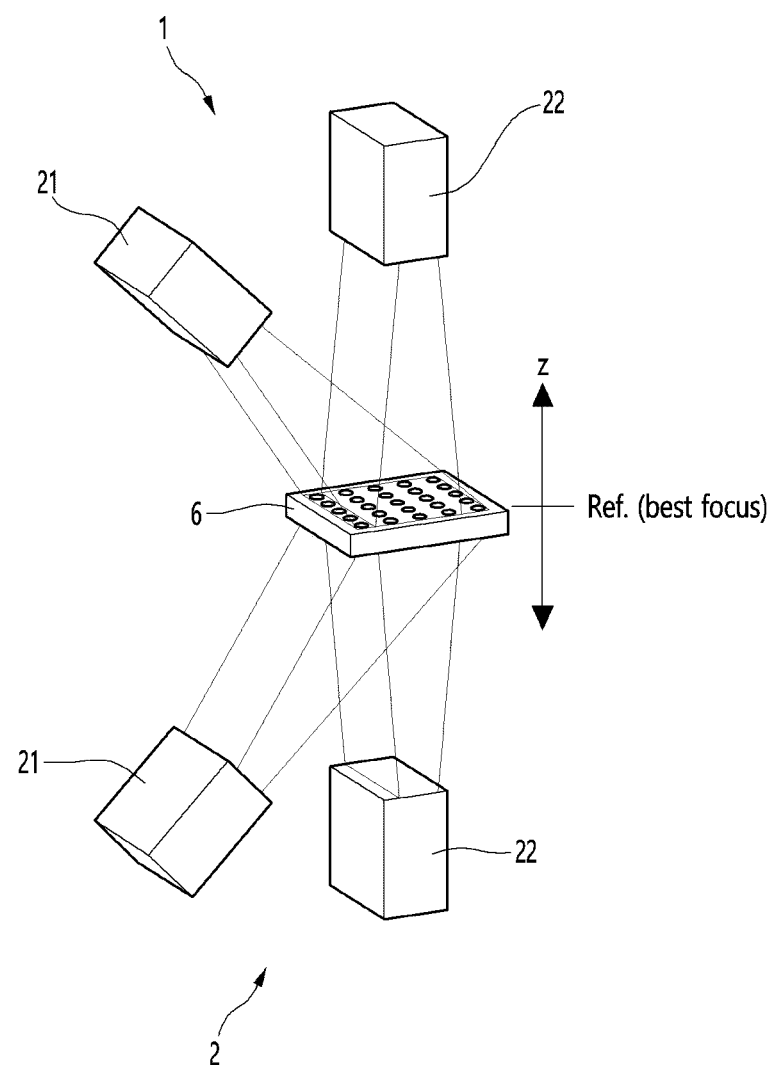

[FIG. 13]
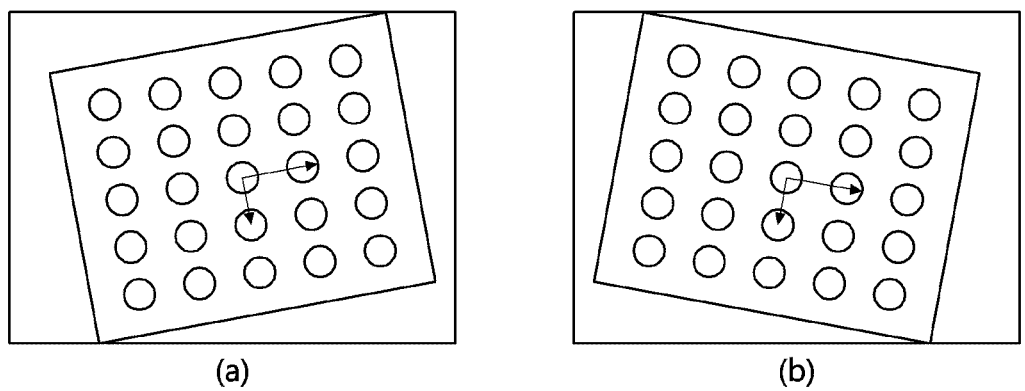

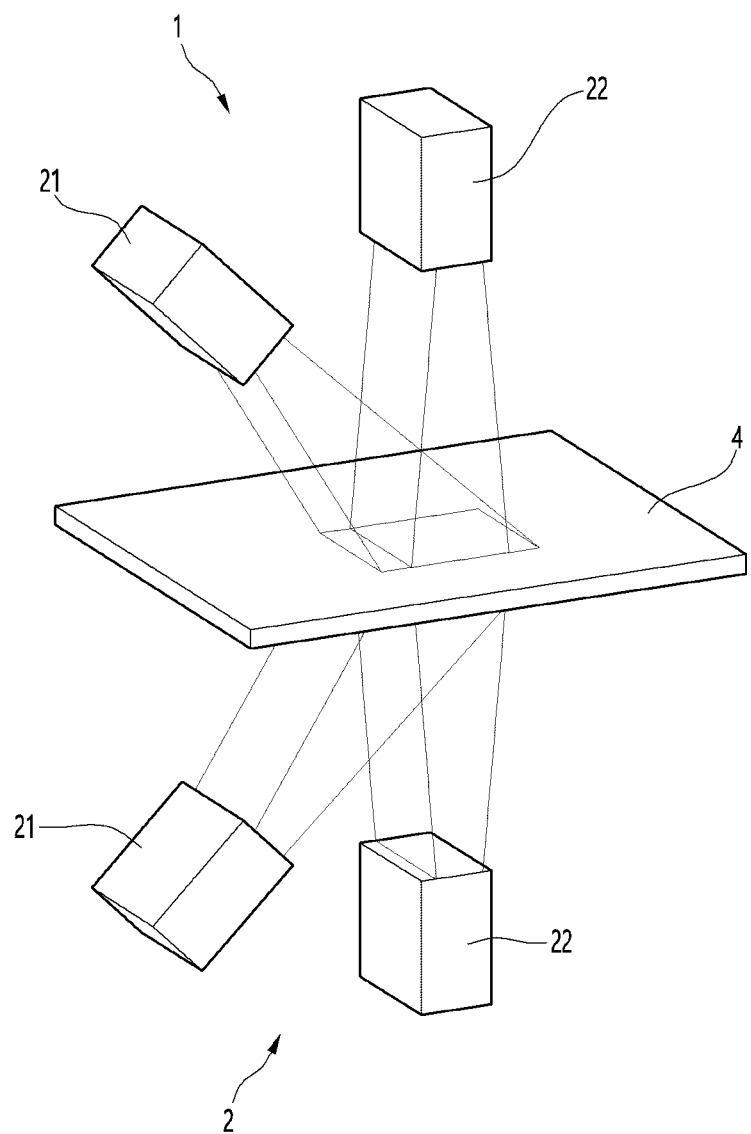
【FIG. 14】

[FIG. 15]
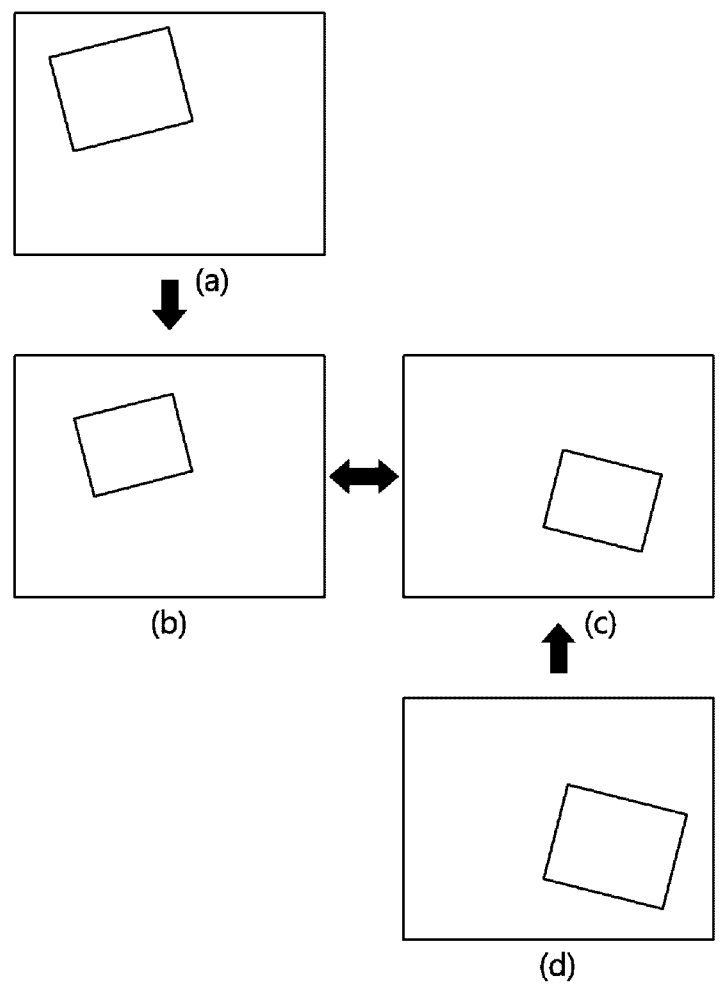

THICKNESS MEASUREMENT DEVICE

CROSS REFERENCE TO RELATED APPLICATIONS

This application is the National Stage filing under 35 U.S.C. 371 of International Application No. PCT/KR2022/095102, filed on May 18, 2022, which claims the benefit of earlier filing date and right of priority to Korean Application No. 10-2021-0064414, filed on May 18, 2021, the contents of all these applications are hereby expressly incorporated by reference into the present application.

TECHNICAL FIELD

The present invention relates to a thickness measurement device.

BACKGROUND ART

An example of a thickness measurement device capable of measuring a thickness of an object to be measured is a device for measuring a thickness of an object to be measured, which is disclosed in Korean Patent Registration Publication No. 10-1912647 B1 (Published on Oct. 29, 2018). In this device for measuring a thickness of an object to be measured (hereinafter, referred to as a measurement object), in a state in which sensors are spaced at a predetermined distance from each other, at least one sensor may measure the measurement object from an upper side of the measurement object, and at least the other sensor may measure the measurement object from a lower side of the measurement object. Here, a thickness of the measurement object is calculated by the formula $D=Gap-(S1+S2)$, where D is a thickness of the measurement object, Gap is a distance between the sensors, S1 is a distance from the upper sensor from a top surface of the measurement object, and S2 is a distance from the lower sensor to a bottom surface of the measurement object, and also, a measurement error generated by at least one of displacements of the sensors or inclinations of the sensors may be corrected with the help of a measuring means, which indicates an edge in a transverse direction to evaluate a position of the edge, and at least two or three point sensors per side surface may be used as the sensors to determine an inclination at one axis or two axes.

DISCLOSURE OF THE INVENTION

Technical Problem

Due to the thickness measurement by the point sensor according to the related art, there are limitations in that a fluctuation of a measurement value is large, it is not easy to calculate the measurement value for an entire area of a measurement specimen, and errors occur when measuring an area of the measurement specimen.

The present embodiment is to provide a thickness measurement device capable of more reliably measuring a thickness of a measurement specimen by compensating an error occurring when measuring the thickness of the measurement specimen.

Technical Solution

A thickness measurement device according to the present embodiment includes; a stage module; an upper optical module that is disposed above the stage module and is spaced apart from the stage module in a Z-axis direction; and a lower optical module that is disposed below the stage module and is spaced apart from the stage module in the Z-axis direction.

The stage module may include: a stage having an area greater than each of an area of the upper optical module and an area of the lower optical module; a Y-axis movement mechanism configured to move the stage along an Y-axis; a measurement specimen placement portion which is disposed on the stage and on which a measurement specimen is seated; a specimen mounting portion on which one of a reference specimen and a correction specimen is selectively mounted; and a specimen mounting portion movement mechanism disposed on the stage to move the specimen mounting to along the Z-axis, wherein the reference specimen is a specimen serving as a reference for thickness measurement, and the correction specimen is a specimen having at least one marker portion thereon.

Each of the upper optical module and the lower optical module may include: a projection part configured to project a moire pattern onto at least one of the measurement specimen, the reference specimen, or the correction specimen; and an imaging part configured to photograph a pattern projected onto the measurement specimen, the reference specimen, or the correction specimen.

Each of the upper optical module and the lower optical module may further include: an optical module case configured to define a space, in which the projection part and the imaging part are accommodated, and have an opening in one surface of top and bottom surfaces thereof.

The measurement specimen placement portion and the specimen mounting portion may be disposed in a line in a Y-axis direction.

The specimen mounting portion may include: a vertical portion in which a specimen insertion portion, in which the reference specimen or the correction specimen is inserted and fixed, is provided and which is elongated in a Z-axis direction; and a horizontal portion that is elongated in the Y-axis direction at an upper side of the vertical portion.

The horizontal portion may be disposed above the specimen mounting portion movement mechanism.

The stage module may further include a horizontality adjustment mechanism configured to adjust horizontality of the reference specimen or the correction specimen.

The stage module may further include an X-axis movement mechanism configured to the measurement specimen placement portion along the X-axis.

The marker portion may be a hole passing through the correction specimen.

A through surface of the hole may be processed to be inclined.

The marker portion may be a protrusion protruding from each of top and bottom surfaces of the correction specimen.

The marker portion may be provided in plurality, which are disposed to be spaced apart from each other on the correction specimen.

Advantageous Effects

According to the present embodiment, the thickness measurement device may measure the 3D shapes of both the side surfaces of the measurement specimen by the upper optical module and the lower optical module at the same time to secure more complete 3D shape information.

In addition, the measurement errors due to the distortion of the upper optical module and the lower optical module, or the changes in the surrounding environments such as the temperature and the illuminance, which occurs when the measurement is performed by the thickness measurement device may be removed.

In addition, since the thickness of the measurement specimen is measured in the non-contact manner by the upper optical module and the lower optical module, the high reliability and the continuous measurement may be possible without contaminating the measurement specimen, the upper optical module, and the lower optical module.

BRIEF DESCRIPTION OF THE DRAWINGS

FIG. 1 is a perspective view of a thickness measurement device according to the present embodiment, FIG. 2 is a perspective view when a reference specimen is disposed between an upper optical module and a lower optical module according to the present embodiment, FIG. 3 is a side view when the reference specimen is disposed between the upper optical module and the lower optical module according to the present embodiment, FIG. 4 is a perspective view when a measurement specimen is disposed between the upper optical module and the lower optical module according to the present embodiment, FIG. 5 is a view of a correction specimen according to the present embodiment, FIG. 6 is a view illustrating a thickness measurement method according to Comparative Example 1 that is compared to the present embodiment, FIG. 7 is a view when measuring a thickness of a measurement specimen having a large degree of warpage or large surface roughness by the thickness measurement method according to Comparative Example 1 that compared to the present embodiment, FIG. 8 is a view illustrating a thick measurement method by the thickness measurement device according to the present embodiment, FIG. 9 is a view when measuring a thickness of a measurement specimen having a large degree of warpage or large surface roughness by the thickness measurement method using the thickness measurement according to the present embodiment, FIG. 10 is a view when capturing an image while adjusting a height of the correction specimen step by step by the thickness measurement device according to the present embodiment, FIG. 11 is a view illustrating the image of the correction specimen, which is photographed by the upper optical module and the lower optical module of the thickness measurement device according to the present embodiment, FIG. 12 is a view when capturing the image of the correction specimen when the correction specimen is disposed at a reference height by the thickness measurement device according to the present embodiment, FIG. 13 is a view illustrating the image of the correction specimen, which is photographed by the upper optical module and the lower optical module according to the present embodiment, FIG. 14 is a view when capturing the image of the measurement specimen by the thickness measurement device according to the present embodiment, and FIG. 15 is a view illustrating an image of the measurement specimen, which is photographed by the upper optical module and the lower optical module according to the present embodiment.

MODE FOR CARRYING OUT THE INVENTION

Hereinafter, detailed embodiments will be described in detail with reference to the accompanying drawings.

FIG. 1 is a perspective view of a thickness measurement device according to the present embodiment, FIG. 2 is a perspective view when a reference specimen is disposed between an upper optical module and a lower optical module according to the present embodiment, FIG. 3 is a side view when the reference specimen is disposed between the upper optical module and the lower optical module according to the present embodiment, FIG. 4 is a perspective view when a measurement specimen is disposed between the upper optical module and the lower optical module according to the present embodiment, and FIG. 5 is a view of a correction specimen according to the present embodiment.

A thickness measurement device may include an upper optical module 1, a lower optical module 2, and a stage module 3.

The thickness measurement device may be a 3D shape measurement device that calculates a thickness and warpage of a specimen while simultaneously measuring 3D information on both side surfaces of the measurement specimen 4, and thus, the 3D shape and the thickness of the measurement specimen 4 may be measured by the thickness measurement device.

The upper optical module 1 and the lower optical module 2 may be connected by a connection member such as a bridge.

The upper optical module 1 and the lower optical module 2 may be a moire optical module that projects a moire pattern onto both side surfaces of each of measurement objects (for example, a measurement specimen 4, a reference specimen 5, and a correction specimen 6) to capture an image of the projected pattern.

The moire pattern may be a larger pattern that appears when small periodic patterns are superimposed.

The measurement specimen 4 may be a semiconductor package or a battery. When the measurement specimen 4 is the battery, the upper optical module 1 and the lower optical module 2 may measure a sealing portion or an electrode coating thickness of the battery.

The reference specimen 5 may be a specimen that serves as a reference (reference surface) for the thickness measurement. The reference specimen 5 is preferably made of a material that is capable of expressing the moire pattern well. The reference specimen 5 is preferably precisely machined to have a uniform thickness and high flatness, and an example of the reference specimen 5 may be made of alloy steel.

The thickness measurement device may grasp a variation level of a measured value of the reference specimen 5 for each measurement of the measured specimen 4 or after measuring a plurality of measured specimens 4 and may compensate for the measured value of the corresponding measured specimen 4.

The correction specimen 6 (see FIG. 5) may be a specimen for measuring distortion of the upper optical module 1 and the lower optical module 2. At least one marker portion 6a that is capable of being photographed by the upper optical module 1 and the lower optical module 2 may be disposed on the correction specimen 6.

An example of the marker portion 6a may be a hole passing through the correction specimen 6. The hole may pass through the correction specimen 6 in a vertical direction Z, and a hole surface connecting a top surface to a bottom surface of the correction specimen 6 may be provided in the correction specimen 6.

Another example of the marker portion 6b may be a protrusion protruding from each of the top and bottom surfaces of the correction specimen 6. The protrusion disposed on the top surface of the correction specimen 6 and the protrusion disposed on the bottom surface of the correction specimen 6 may have the same size and shape.

The correction specimen 6 is preferably made of a material in which the marker portion 6a is formed well. One example of the correction specimen 6 may be made of alloy steel, and another example of the correction specimen 6 may be engineering plastic material that is easily punched.

Here, (a) of FIG. 5 is a plan view of the correction specimen 6, (b) of FIG. 5 is an enlarged cross-sectional view illustrating an example of the hole defined in the correction specimen 6, and (c) of FIG. 5 is an enlarged cross-sectional view illustrating another example of the hole defined in the correction specimen 6.

As illustrated in (a) of FIG. 5, a plurality of marker portions 6a may be disposed on the correction specimen 6, and the plurality of correction specimens 6 may be spaced apart from each other.

Hereinafter, the marker portion 6a will be described as the hole defined in the correction specimen 6, but is not limited thereto. It is also possible that the marker portion 6a is a coating layer disposed on the top and bottom surfaces of the protrusion or the correction specimen 6 or a separate marking member attached to the top and bottom surfaces of the correction specimen 6.

As illustrated in (b) of FIG. 5, an example of the hole may be a hole processed to be inclined and may be defined so that an area increases or decreases in the vertical direction. As an example of the hole, a through surface of the hole may be processed to be inclined. A cross-section of the hole may have a rhombus shape.

As illustrated in (c) of FIG. 5, another example of the hole may be a hole processed vertically, and an area thereof may be the same in the vertical direction.

The hole may be various shapes such as a polygon such as a circle, a quadrangle, or the like.

When any one of the upper optical module 1 and the lower optical module 2 is installed incorrectly (for example, when optical axes of the upper optical module 1 and the lower optical module 2 do not coincide with each other), an image (e.g., elliptical shape) of the marker 6a photographed by the upper optical module 1 and an image (e.g., circular shape) of the marker 6a photographed by the lower optical module 2 may be different from each other, and the thickness measurement device may compare the images with each other to calculate a degree of distortion.

A measurement area (double-sided measurement area) measured by the upper optical module 1 and the lower optical module 2 may be disposed between the upper optical module 1 and the lower optical module 2.

The thickness measurement device may correct/compensate the distortion of the double-sided measurement area caused by displacement or rotation of the upper optical module 1 and the lower optical module 2, and measurement errors of the measurement specimen 4 due to the displacement or rotation of the double-sided measurement module (i.e., the upper optical module 1 and the lower optical module 2) may be removed.

The upper optical module 1 may be disposed above the stage module 3 and may be spaced apart from the stage module 3 in the Z-axis direction Z. The Z-axis direction may be a vertical direction.

The lower optical module 2 is disposed below the stage module 3 and may be spaced apart from the stage module in the Z-axis direction. The lower optical module 2 may be spaced apart from the upper optical module 1 in the Z-axis direction.

The upper optical module 1 and the lower optical module 2 may be disposed symmetrically with respect to each other. The lower optical module 2 may be vertically symmetrical with the upper optical module 1 with the stage module 3 interposed therebetween.

The upper optical module 1 may measure a 3D shape of one surface, that is, a 3D shape of the top surface of the measurement specimen 4, and the lower optical module 2 may measure a 3D shape of the other surface, that is, a 3D shape of the bottom surface of the measurement specimen 4.

Each of the upper optical module 1 and the lower optical module 2 may include a projection part and an imaging part 22.

The projection part 21 may project a moire pattern onto the measurement specimen 4, the reference specimen 5, or the correction specimen 6. An example of the projection part 21 may be a digital optical projector mechanism that selectively reflects light by a spatial light modulator element to form the moire pattern. The projection part 21 may be a method for forming the moire pattern by selectively reflecting light incident from an illumination using a spatial light modulator (SLM) element that is called a digital micromirror device (DMD), and an optical mechanism including the DMD may be a digital light projector (DLP).

The imaging part 22 may photograph a pattern projected onto the measurement specimen 4, the reference specimen 5, or the correction specimen 6. An example of the imaging part 22 may be an area sensor such as a camera capable of photographing the moire pattern projected onto the measurement specimen 4, the reference specimen 5, or the correction specimen 6. The imaging part 22 may be capable of high-reliability and high-speed measurement of the 3D shape of the entire area of the measurement specimen 4, the reference specimen 5, or the correction specimen 6 when compared to a point sensor.

Each of the upper optical module 1 and the lower optical module 2 may further include an optical module case 23 having a space in which the projection part 21 and the imaging part 22 are accommodated.

An opening may be defined in one surface of top and bottom surfaces of the optical module case 23.

A bottom surface opening may be defined in the bottom surface of the optical module case 23 of the upper optical module 1. The moire pattern projected from the projection part 21 of the upper optical module 1 may pass through the bottom surface opening, and the imaging part 22 of the upper optical module 1 may pass through the bottom surface opening to measure the pattern projected on the top surface of the measurement specimen 4, the reference specimen 5, or the correction specimen 6.

A top surface opening may be defined in the top surface of the optical module case 23 of the lower optical module 2. The moire pattern projected from the projection part 21 of the lower optical module 2 may pass through the top surface opening, and the imaging part 22 of the lower optical module 1 may pass through the top surface opening to measure the pattern projected on the bottom surface of the measurement specimen 4, the reference specimen 5, or the correction specimen 6.

At least one heat dissipation hole 24 may be defined in the optical module case 23. The heat dissipation hole 24 may be defined in a circumferential surface of the optical module case 23.

The stage module 3 may include a stage 7, a measurement specimen placement portion 8 which is disposed on the stage 7 and on which the measurement specimen 4 is seated, a specimen mounting portion 9 on which the reference specimen 5 or a fixed specimen 6 are mounted, a specimen mounting portion movement mechanism 10 disposed on the stage 7 to move the specimen mounting portion 8 to the Z-axis. The stage module 3 may further include a control unit 11 capable of adjusting horizontality of the reference specimen 5 or the correction specimen 6.

The stage 7 may have an area that is wider than that of each of the upper optical module 1 and the lower optical module 2. The stage 7 may have an opening 7a defined below a gap G between the pair of measurement specimen placement portions 8. The lower optical module 2 may project the moire pattern onto the bottom surface of the measurement specimen 4 through the opening 7a of the stage 7 and may photograph the pattern projected on the bottom surface of the measurement specimen 4 through the opening 7a of the stage 7.

The pair of measurement specimen placement portions 8 may be provided on a top surface of the stage 7. The pair of measurement specimen placement portions 8 may be spaced apart from each other in an X-axis direction X. The gap G may be defined between the pair of measurement specimen placement portions 8. An example of the X-axis direction X may be a forward and backward direction.

At least one of the pair of measurement specimen placement portions 8 may be capable of moving forward and backward in the X-axis direction X.

The measurement specimen 4 may be seated on the pair of measurement specimen placement portions 8 disposed between the pair of measurement specimen placement portions 8.

One of the reference specimen 5 and the correction specimen 6 may be selectively mounted on the specimen mounting portion 9. The specimen mounting portion 9 may be a fixing jig to which the reference specimen 5 or the correction specimen 6 is fixed.

The specimen mounting portion 9 may be continuously disposed with the measurement specimen placement portion 8, and a time delay between the measurement of the measurement specimen 4 and the measurement of the reference specimen 5 or the correction specimen 6 may be minimized. The specimen mounting portion 9 may be spaced apart from the measurement specimen placement portion 8 in the Y-axis direction Y. The specimen mounting portion 9 and the measurement specimen placement portion 8 may be disposed above the stage 7. The specimen mounting portion 9 may be disposed in a line with the measurement specimen placement portion 8 in the Y-axis direction Y. An example of the Y-axis direction Y may be a left and right direction. The specimen mounting portion 9 may be spaced apart from the measurement specimen placement portion 8 in the left and right direction.

The specimen mounting portion 9 may include a specimen insertion portion 9a into which one side of the reference specimen 5 or one side of the correction specimen 6 is inserted and fixed. The specimen mounting portion 9 may include a vertical portion 9b that is elongated in the Z-axis direction Z and a horizontal portion 9c that is elongated in the Y-axis direction at an upper side of the vertical portion 9b.

The specimen insertion portion 9a may be disposed on the vertical portion 9b.

The horizontal portion 9c may be disposed above the specimen mounting portion movement mechanism 10.

The specimen mounting portion movement mechanism 10 may be adjustable in position in directions of the optical modules 1 and 2 that are different from each other and may be a specimen mounting portion elevation unit or a specimen mounting portion driving unit that elevates the specimen mounting portion 8.

The specimen mounting portion movement mechanism 10 may allow the reference specimen 5 or the correction specimen 6 to ascend closer to the upper optical module 1 of the upper optical module 1 and the lower optical module 2. The specimen mounting portion movement mechanism 10 may allow the reference specimen 5 or the correction specimen 6 to descend closer to the lower optical module 2 of the upper optical module 1 and the lower optical module 2.

The control unit 11 may be a horizontality adjustment mechanism or a horizontality adjustment unit that is capable of adjusting an inclination of the reference specimen 5 or the correction specimen 6. An example of the horizontality adjustment mechanism may include an actuator such as a motor that adjusts an angle of the specimen mounting portion 9. The horizontality mechanism is not limited to the type capable of adjusting the angle or inclination of the specimen mounting portion 9.

The stage module 3 may include an X-axis movement mechanism 12 that moves the measurement specimen placement portion 8 along the X-axis and a Y-axis movement mechanism 13 that moves the stage 7 along the Y-axis.

The X-axis movement mechanism 12 may include an actuator 12a such as a motor, and a shaft 12b connecting the actuator 12a to the measurement specimen placement portion 8. The shaft 12b may be disposed to be elongated in the X-axis direction X. The shaft 12b may be connected to one of the pair of measurement specimen placement portion 8.

The Y-axis movement mechanism 13 may include an actuator (not shown) such as a motor and a linear guide 13b connecting the actuator to the measurement specimen placement portion 8.

As illustrated in FIG. 3, the Y-axis movement mechanism 13 may allow the stage 7 to move forward and backward in the Y-axis direction so that the reference specimen 5 or the correction specimen 6 mounted on the specimen mounting portion 8 is disposed between the upper optical module 1 and the lower optical module 2.

As illustrated in FIG. 4, the Y-axis movement mechanism 13 may allow the stage 7 to move forward and backward in the Y-axis direction Y so that the measurement specimen 4 seated on the measurement specimen placement portion 8 passes between the upper optical module 1 and the lower optical module 2. The upper optical module 1 and the lower optical module 2 may photograph a plurality of areas of the measurement specimen 4 when the measurement specimen 4 passes between the upper optical module 1 and the lower optical module 2.

In performing the measurement of the 3D shape using the thickness measurement device, the measurement value fluctuation due to the change in the surrounding environments (temperature, illumination, etc.) may be compensated for by tracking the measurement value of the reference specimen 5 according to the change in the surrounding environments.

The measurement of the reference specimen 5 may be performed at a specific period (when measuring each measurement specimen or after measuring each measurement specimen 10 times), and absolute displacement values of the top/bottom surfaces of the measurement sample 4 may be measured from the reference surface of the reference specimen 5 measured at a specific period to compensate for the measurement value and then calculate a thickness value of the measurement specimen 4.

When the thickness measurement device measures the 3D shape, measurement errors due to the distortion of the double-sided measurement area caused by the displacement or rotation of the double-sided optical modules 1 and 2 may be calculated using the correction specimen 6 and then be removed by a matching algorithm between modules 1 and 2.

The matching algorithm between the optical modules 1 and 2 may be calculated using the correction specimen 6 having a plurality of punched holes by capturing images of both surfaces of the correction specimen 6 to grasp a level of distortion (displacement/rotation/scale) for each position of the punched hole.

Center coordinates of any punched hole may be obtained from the images of both the surfaces of the correction specimen 4, which are obtained by the imaging part 22 of the upper optical module 1 and the imaging part 22 of the lower optical module 2, and a deviation may be obtained by comparing the center coordinates of the punched holes according to the change between the optical modules 1 and 2.

In order to obtain deviation information according to the change in the measurement area of the correction specimen 6, the deviation of the punched holes at different positions in the fixed correction specimen 6 may be obtained, or a deviation change for the punched hole at a specific position in the correction specimen 7 may be obtained while moving the stage 7 to move the correction specimen 7.

The matching algorithm may be calculated that reflects the distortion characteristics of the upper and lower measurement modules 1 and 2 by using the deviation information at the different positions, and the measurement area on one surface may be converted to match the measurement area on the other surface by using the algorithm to remove the measurement errors due to the displacement or rotation of the double-sided optical modules 1 and 2.

The matching algorithm between the optical modules 1 and 2 may be calculated according to different heights, and precise optical module matching may be performed on the 3D area through the application of the algorithm.

A sequence for obtaining the matching algorithm between the optical modules 1 and 2 may be performed at different heights, and thus, high-accuracy correction may be possible through different matching algorithm calculations for 3D position changes.

That is, the matching algorithm may be performed at different correction specimen heights to be extended to a 3D matching algorithm, thereby realizing very precise correction.

FIG. 6 is a view illustrating a thickness measurement method according to Comparative Example 1 that is compared to the present embodiment, and FIG. 7 is a view when measuring a thickness of a measurement specimen having a large degree of warpage or large surface roughness by the thickness measurement method according to Comparative Example 1 that compared to the present embodiment, Comparative Example 1 may use relative displacement, as illustrated in FIG. 6, the measurement specimen 4 may be seated on the top surface of the stage 7, and the upper optical module 1 disposed above the stage 7 may be disposed so that the upper optical module 1 measures a first distance Depth 2 from the upper optical module 1 to the top surface of the stage 7 and a second distance Depth 2 from the upper optical module 1 to the top surface of the measurement specimen 4.

In Comparative Example 1, the 3D shape (height difference and degree of warpage) of one surface of the measurement specimen 4 may be measured, and a thickness t of the measurement specimen 4 may be measured by measuring the height different between the top surface of the stage 7 and the top surface of the measurement specimen 4.

The thickness t of the measurement specimen 4 may be calculated by subtracting the second distance Depth1 from the first distance Depth2.

In Comparative Example 1, a constant height difference may be measured regardless of the fluctuation in the upper optical module 1.

However, in the case of Comparative Example 1, as illustrated in (a) of FIG. 7, it is difficult to measure an actual thickness of the measurement specimen 4 having a large degree of warpage, as shown in (a) of FIG. 7, and as illustrated in (b) of FIG. 7, it is difficult to measure the thickness of the measurement specimen 4 having large surface roughness.

FIG. 8 is a view illustrating a thick measurement method by the thickness measurement device according to the present embodiment, and FIG. 9 is a view when measuring a thickness of a measurement specimen having a large degree of warpage or large surface roughness by the thickness measurement method using the thickness measurement according to the present embodiment, The thickness measurement device according to the present embodiment may use an absolute displacement, and as illustrated in FIG. 8, the measurement specimen 4 may be seated on the measurement specimen placement portion 8, the upper optical module 1 may be disposed above the stage 7, the lower optical module 2 may be disposed below the stage 7, the upper optical module 1 may measure a first height value Height1 from a virtual plane (zero plane) to the top surface of the measurement specimen 4, and the lower optical module 2 may measure a second height value Height2 from the virtual plane (zero plane) to the bottom surface of the measurement specimen 4.

The thickness measurement device according to the present embodiment may measure the 3D shape (height difference and degree of warpage) of both the surfaces of the measurement specimen 4 and may measure a thickness of the measurement specimen 4 by measuring the height values Height1 and Height2 of the top/bottom surfaces of the measurement specimen 4 from the virtual plane (zero plane).

The thickness t of the measurement specimen 4 may be calculated by adding the second height value Height2 to the first height value Height1.

The thickness measurement device according to the present embodiment may measure the degree of warpage of the measurement specimen 4 having the large degree of warpage as illustrated in (a) of FIG. 9 or may accurately measure the thickness of the measurement specimen 4 regardless of the surface roughness of the specimen 4 as illustrated in (b) of FIG. 9.

As described above, a thickness measurement method using the thickness measurement device may include a process of correcting a measurement specimen 4 before measuring the measurement specimen 4 (hereinafter, referred to a correction process) and a process of compensating the measurement specimen 4 while measuring the measurement specimen 4 (hereinafter, referred to a compensation process).

The correction process may include a horizontal (X-axis and Y-axis) correction process and a vertical (Z-axis) correction process.

In the horizontal (X-axis and Y-axis) correction process, both surfaces of a correction spacemen 6 may be imaged at the same time using the correction specimen 6 having a plurality of punched holes 6a, and then, a level (displacement/rotation/scale) of distortion for each hole position may be grasped to calculate a matching algorithm between the optical modules 1 and 2. In the horizontal (X-axis and Y-axis) correction process, the above-described calculation may be performed at different position in the vertical direction (Z-axis) to extract the level of displacement/rotation/scale due to a distance between each of the optical measurement modules 1 and 2 and the correction specimen 6, thereby performing 3D correction.

In the vertical (Z-axis) correction process, both surfaces of a reference specimen 5 may be imaged to perform a process of performing calibration of a height due to movement of the reference specimen 5 in the Z-direction while imaging the both surfaces of the reference specimen 5 by using the reference specimen 5 having a uniform thickness and high flatness, and thus, the calibration may be performed so that the thickness may be measured by forming a common reference plane of the different optical measurement modules 1 and 2 through the above-described process. A moire pattern of each of top/bottom surfaces of the reference specimen 5 may be acquired at the same time while changing the height of the reference specimen 5 to perform the calibration with matching the 'reference plane'.

The compensation process may include a specimen inclination compensation process and an environment change compensation process.

In the specimen inclination compensation process, an inclination of each of both the surfaces of the measurement specimen 4 may be calculated using the moire height measurement value (area) to compensate for an error level that may occur when the measurement specimen 4 is measured with a constant inclination.

In the environmental change compensation process, after the completion of measurement in a unit of each measurement specimen 4 or in a unit of a specific measurement specimen group, it is possible to compensate for the specimen measurement value of the corresponding level by identifying the level of variation in the measurement value of the reference specimen.

The thickness measurement device may perform a process of extracting the distortion relationship between the upper optical module 1 and the lower optical module 2 using the hole image of the correction specimen 6, and a process of extracting the distortion relationship between the upper optical module 1 and the lower optical module 2 on the reference plane may be performed.

FIG. 10 is a view when capturing an image while adjusting a height of the correction specimen step by step by the thickness measurement device according to the present embodiment, and FIG. 11 is a view illustrating the image of the correction specimen, which is photographed by the upper optical module and the lower optical module of the thickness measurement device according to the present embodiment.

(a) of FIG. 11 illustrates an image of the top surface of the correction specimen, which is photographed by the upper optical module when the correction specimen is disposed at an upper limit height, (b) of FIG. 11 illustrates an image of the top surface of the correction specimen, which is photographed by the upper optical module when the correction specimen is disposed at a reference height, and (c) of FIG. 11 illustrates an image of the top surface of the correction specimen, which is photographed by the upper optical module when the correction specimen is disposed at a lower limit height.

(d) of FIG. 11 illustrates an image of the top surface of the correction specimen, which is photographed by the lower optical module when the correction specimen is disposed at an upper limit height, (e) of FIG. 11 illustrates an image of the top surface of the correction specimen, which is photographed by the lower optical module when the correction specimen is disposed at a reference height, and (f) of FIG. 11 illustrates an image of the top surface of the correction specimen, which is photographed by the lower optical module when the correction specimen is disposed at a lower limit height.

The correction specimen 6 may be elevated in multiple stages from the upper limit height to the lower limit height by the specimen mounting portion movement mechanism 10, and the upper optical module 1 and the lower optical module 2 may capture each images of the correction specimen 6 for each height.

The upper optical module 1 and the lower limit optical module 2 may select a best focus point between the upper limit height and the lower limit height as a reference height Ref to capture the image of the correction specimen 6 for each height between the upper limit height and the lower limit height with respect to the reference height Ref.

The thickness measurement device may extract a change in image information of the correction specimen 6 according to a change in height (Z-axis) of the correction specimen 6 relative to the reference height Ref (each of the upper/lower images is performed).

The thickness measurement device may extract coordinates of the hole using the image of the correction specimen 6, which is photographed for each height, and matrix change information of the coordinates of the hole according to the change in the height of the calibration specimen 6 relative to the reference height Ref may be extracted using the matrix of the coordinates of the extracted hole.

Equation 1 is an equation that is expressed for calculating coordinate values extracted from the upper optical module, and Equation 2 is an equation that is expressed for calculating coordinate values extracted from the lower optical module.

$$TOPref = Rt(z)*TOPo + Tt(z) \quad \text{[Equation 1]}$$

$$BOTref = Rb(z)*BOTo + Tb(z) \quad \text{[Equation 2]}$$

Here, TOPref and BOTref are coordinate values at a height z.

The TOPo and BOTo are coordinate values at height z, the Rt(z) and Rb(z) are rotation/magnification values required when converted to the coordinate values at the reference height Ref matching (same position) the coordinate values at the height z, and the Tt(z) and Tb(z) are translations required when converted to the coordinate values at the reference height Ref that match the coordinate values at the height z.

When using Equations 1 and 2, if corresponding coordinates at an arbitrary height z are input, a coordinate value at the reference height, which match the corresponding coordinates, may be known.

FIG. 12 is a view when capturing the image of the correction specimen when the correction specimen is disposed at the reference height by the thickness measurement device according to the present embodiment, and FIG. 13 is a view illustrating the image of the correction specimen, which is photographed by the upper optical module and the lower optical module according to the present embodiment.

(a) of FIG. 13 illustrates an image of the top surface of the correction specimen, which is photographed by the upper optical module when the correction specimen is disposed at the reference height Ref, and (b) of FIG. 13 illustrates an image of the bottom surface of the correction specimen, which is photographed by the lower optical module when the correction specimen is disposed at the reference height Ref.

The upper optical module 1 and the lower limit optical module 2 may capture the image of the correction specimen 6 disposed at the reference height Ref.

The upper optical module 1 and the lower limit optical module 2 may select the best focus point as the reference height Ref to capture the image of the top surface and the image of the bottom surface at the selected reference height Ref. The reference height Ref may be the same as the extracted heights in Equations 1 and 2.

The thickness measurement device may calculate the vertical distortion through the relational expression by comparing of the upper and lower images to each other.

The thickness measurement device may extract coordinates of the hole using the image of the correction specimen 6, and matrix change information of the coordinates of the hole defined in the correction specimen 6 between the upper/lower images at the reference height Ref may be extracted using the matrix of the coordinates of the extracted hole.

Equation 3 is an equation that is expressed for calculating coordinate values extracted from the upper optical module, and Equation 3 is an equation that is expressed for calculating coordinate values extracted from the lower optical module.

$$\text{TOPref} = R(\text{ref}) \ast \text{BOTref} + T(\text{ref}) \text{ or BOTref} = R(\text{ref}) \ast \text{TOPref} + T(\text{ref}) \quad \text{[Equation 3]}$$

Here, the TOPref and BOTref are coordinate values of the top/bottom surfaces, which match each other (same position) at the reference height z.

The Rt(ref) is rotation/magnification values required when converted to coordinate values of the top/bottom surfaces, which match the coordinate values of the top/bottom surfaces at the reference height Ref, and T(ref) is translations required when converted to the coordinate values at the reference height.

When using Equation 3, if the coordinates of the bottom surface (or top surface) of an arbitrary position (x, y) at the reference height are input, a coordinate value of the top surface (or bottom surface) at the reference height, which matches the coordinates, may be known.

When using Equation 3, if the coordinates of the bottom surface (or top surface) of an arbitrary position (x, y) at an arbitrary height z are input, a coordinate value of the top surface (or bottom surface) at the reference height, which matches the coordinates, may be known.

FIG. 14 is a view when capturing the image of the measurement specimen by the thickness measurement device according to the present embodiment, and FIG. 15 is a view illustrating an image of the measurement specimen, which is photographed by the upper optical module and the lower optical module according to the present embodiment.

In FIG. 14, it may be assumed that a height of the bottom surface of the measurement specimen 4 may be 1,000, a height of the top surface of the measurement specimen is 3,000, and a reference height is 2,000.

(a) of FIG. 15 illustrates an image of the top surface of the measurement specimen, which is measured at a height higher than the reference height by a set height, (b) of FIG. 15 illustrates an image of the top surface of the measurement specimen, which is measured at the reference height, (c) of FIG. 15 illustrates an image of the bottom surface of the measurement specimen, which is measured at the reference height, and (d) of FIG. 15 illustrates an image of the top surface of the measurement specimen, which is measured at a height lower than the reference height by a set height.

The thickness measurement device may calculate target coordinate information at the reference height, which matches target coordinate information at an imaging height of the measurement specimen 4 (performed on each of the heights of the top/bottom surfaces). The thickness measurement device may calculate positional coordinates of the measurement target (measurement specimen) at the reference height, which match positional coordinates of the measurement target imaged at the height of the top/bottom surfaces of the measurement specimen using Equations 1 and 2.

The thickness measurement device may calculate coordinate information in which the upper and lower images match each other at the reference height. The thickness measurement device may calculate measurement target coordinate information of the top surface (or bottom surface) that matches the coordinates of the measurement target of the bottom surface (or top surface) at the same height (reference height) using Equation 3.

That is, the distortion of the upper optical module 1 and the lower optical module 2 may be corrected through the above-described calculation processes, and the coordinates of the measurement target, which accurately match vertically each other, may be secured, and also, the thickness of the measurement target may be more accurately calculated using the height data of the measurement target.

The above-disclosed subject matter is to be considered illustrative, and not restrictive, and the appended claims are intended to cover all such modifications, enhancements, and other embodiments, which fall within the true spirit and scope of the present disclosure.

Thus, the embodiment of the present disclosure is to be considered illustrative, and not restrictive, and the technical spirit of the present disclosure is not limited to the foregoing embodiment.

Therefore, the scope of the present disclosure is defined not by the detailed description of the invention but by the appended claims, and all differences within the scope will be construed as being included in the present disclosure.

The invention claimed is:

1. A thickness measurement device comprising;
   a stage module;
   an upper optical module that is disposed above the stage module and is spaced apart from the stage module in a Z-axis direction; and
   a lower optical module that is disposed below the stage module and is spaced apart from the stage module in the Z-axis direction,
   wherein the stage module comprises:
   a stage having an area greater than each of an area of the upper optical module and an area of the lower optical module;
   a Y-axis movement mechanism configured to move the stage along a Y-axis direction;
   a measurement specimen placement portion which is disposed on the stage and on which a measurement specimen is seated;
   a specimen mounting portion on which one of a reference specimen and a correction specimen is selectively mounted; and
   a specimen mounting portion movement mechanism disposed on the stage to move the specimen mounting portion along the Z-axis direction, wherein the reference specimen is a specimen serving as a reference for a thickness measurement, and the correction specimen is a specimen having at least one marker portion thereon, wherein a thickness of the measurement specimen is determined by:

while the upper optical module is disposed above the stage and the lower optical module is disposed below the stage, seating the measurement specimen on the measurement specimen placement portion, measuring by the upper optical module a first height value from a virtual plane to a top surface of the measurement specimen, and measuring by the lower optical module a second height value from the virtual plane to a bottom surface of the measurement specimen, and calculating the thickness of the measurement specimen by adding the first height value and the second height value, and wherein the thickness measurement device further performs:

a process of correcting at least one of a warpage and surface roughness in the measurement specimen before measuring the first height value and the second height value; and a process of compensating the measurement specimen while measuring the first height value and the second height value.

2. The thickness measurement device according to claim 1, wherein each of the upper optical module and the lower optical module comprises:

a projection part configured to project a moire pattern onto at least one of the measurement specimen, the reference specimen, and the correction specimen; and an imaging part configured to photograph the moire pattern projected onto at least one of the measurement specimen, the reference specimen, and the correction specimen.

3. The thickness measurement device according to claim 2, wherein each of the upper optical module and the lower optical module further comprises:

an optical module case configured to define a space, in which the projection part and the imaging part are accommodated, and have an opening in one surface of top and bottom surfaces thereof.

4. The thickness measurement device according to claim 1, wherein the measurement specimen placement portion and the specimen mounting portion are disposed above the stage in the z-axis direction.

5. The thickness measurement device according to claim 1, wherein the specimen mounting portion comprises:

a vertical portion in which a specimen insertion portion, in which the reference specimen or the correction specimen is inserted and fixed, the vertical portion being provided and elongated in the Z-axis direction; and a horizontal portion that is elongated in the Y-axis direction at an upper side of the vertical portion.

6. The thickness measurement device according to claim 5, wherein the horizontal portion is disposed above the specimen mounting portion movement mechanism.

7. The thickness measurement device according to claim 1, wherein the stage module further comprises an X-axis movement mechanism configured to move the measurement specimen placement portion along an X-axis direction.

8. The thickness measurement device according to claim 1, wherein the at least one marker portion is a hole passing through the correction specimen.

9. The thickness measurement device according to claim 8, wherein a through surface of the hole includes an inclined surface.

10. The thickness measurement device according to claim 1, wherein the at least one marker portion is a protrusion protruding from each of top and bottom surfaces of the correction specimen.

11. The thickness measurement device according to claim 1, wherein a plurality of marker portions is provided which includes the at least one marker portion, and the plurality of marker portions are disposed to be spaced apart from each other on the correction specimen.

12. The thickness measurement device according to claim 8, wherein a through surface of the hole includes a vertical surface.

13. The thickness measurement device according to claim 1, wherein the process of correcting includes:

a horizontal correction process that images both surfaces of the correction specimen at the same time, and calculating a matching algorithm between the upper optical module and the lower optical module using a level of distortion for the at least one marker portion; and a vertical correction process that images both surfaces of the reference specimen to perform calibration process of a height due to a movement of the reference specimen in the Z-axis direction.

14. The thickness measurement device according to claim 1, wherein the process of compensating includes:

a specimen inclination compensation process to calculate an inclination of each of both surfaces of the measurement specimen using a moire height measurement value to compensate for an error level; and an environmental change compensation process, after the completion of measurement in a unit of each measurement specimen 4 or in a unit of a specific measurement specimen group, it is possible to compensate for the specimen measurement value of the corresponding level by identifying the level of variation in the measurement value of the reference specimen.

15. A thickness measurement device comprising:

a stage module;

an upper optical module that is disposed above the stage module and is spaced apart from the stage module in a Z-axis direction; and a lower optical module that is disposed below the stage module and is spaced apart from the stage module in the Z-axis direction, wherein the stage module comprises:

a stage having an area greater than each of an area of the upper optical module and an area of the lower optical module;

a Y-axis movement mechanism configured to move the stage along a Y-axis direction;

a measurement specimen placement portion which is disposed on the stage and on which a measurement specimen is seated;

a specimen mounting portion on which one of a reference specimen and a correction specimen is selectively mounted; and a specimen mounting portion movement mechanism disposed on the stage to move the specimen mounting portion along the Z-axis direction, wherein the reference specimen is a specimen serving as a reference for a thickness measurement, and the correction specimen is a specimen having at least one marker portion thereon, wherein the stage module further comprises a horizontality adjustment mechanism configured to adjust an inclination of the reference specimen or the correction specimen, wherein the specimen mounting portion comprises:

a vertical portion in which a specimen insertion portion, in which the reference specimen or the correction specimen is inserted and fixed, the vertical portion being provided and elongated in the Z-axis direction; and a horizontal portion that is elongated in the Y-axis direction at an upper side of the vertical portion, and wherein the horizontality adjustment mechanism is disposed below the horizontal portion and adjusts an angle of the specimen mounting portion, wherein a thickness of the measurement specimen is determined by:

while the upper optical module is disposed above the stage and the lower optical module is disposed below the stage, seating the measurement specimen on the measurement specimen placement portion, measuring by the upper optical module a first height value from a virtual plane to a top surface of the measurement specimen, and measuring by the lower optical module a second height value from the virtual plane to a bottom surface of the measurement specimen, and calculating the thickness of the measurement specimen by adding the first height value and the second height value, and wherein the thickness measurement device further performs:

a process of correcting at least one of a warpage and surface roughness in the measurement specimen before measuring the first height value and the second height value; and a process of compensating the measurement specimen while measuring the first height value and the second height value.

16. The thickness measurement device according to claim 15, wherein the stage module further comprises an X-axis movement mechanism configured to move the measurement specimen placement portion along an X-axis direction.

* * * * *